United States Patent
Cai et al.

(10) Patent No.: US 7,184,623 B2
(45) Date of Patent: Feb. 27, 2007

(54) APPARATUS, SYSTEM AND METHOD FOR AN ADIABATIC COUPLER FOR MULTI-MODE FIBER-OPTIC TRANSMISSION SYSTEMS

(75) Inventors: Ming Cai, Fremont, CA (US);
Giovanni Barbarossa, Saratoga, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 11/051,742

(22) Filed: Feb. 3, 2005

(65) Prior Publication Data
US 2005/0265653 A1 Dec. 1, 2005

Related U.S. Application Data

(60) Provisional application No. 60/574,470, filed on May 25, 2004.

(51) Int. Cl.
*G02B 6/26* (2006.01)

(52) U.S. Cl. .......................... 385/28; 385/43; 385/147; 359/333

(58) Field of Classification Search .................... 372/6, 372/49; 359/333; 385/123, 129, 141, 147, 385/28–29, 33–36, 43, 6, 49
See application file for complete search history.

(56) References Cited

U.S. PATENT DOCUMENTS 6,185,346 B1 * 2/2001 Asawa et al. ................. 385/28
6,324,326 B1 * 11/2001 Dejneka et al. ............. 385/123

* cited by examiner

*Primary Examiner*—Akm Enayet Ullah
(74) *Attorney, Agent, or Firm*—Patterson & Sheridan, LLP

(57) ABSTRACT

An improved fiber-optic communications system comprises a multi-mode waveguide carrying an optical signal, a single-mode waveguide optically coupled to and receiving the optical signal from the multi-mode waveguide and an adiabatic coupler optically coupled between the multi-mode waveguide and the single-mode waveguide. The multi-mode and single-mode waveguides may be optical fibers. The adiabatic coupler may comprise a tapered core surrounded by a cladding. Alternatively, the adiabatic coupler may comprise a core surrounded by a cladding, wherein the refractive index of at least one of the core and the cladding varies over the length of the adiabatic coupler.

18 Claims, 15 Drawing Sheets

APPARATUS, SYSTEM AND METHOD FOR AN ADIABATIC COUPLER FOR MULTI-MODE FIBER-OPTIC TRANSMISSION SYSTEMS

CROSS-REFERENCE TO RELATED APPLICATION(S)

This application relates to, and claims the priority benefit of, U.S. Provisional Patent Application No. 60/574,470 titled, "Apparatus, System and Method for an Adiabatic Coupler for Multi-Mode Fiber-Optic Transmission Systems," filed on May 25, 2004. The subject matter of this related application is hereby incorporated by reference.

FIELD OF THE INVENTION

The present invention relates to fiber-optic communications systems. More particularly, the present invention relates to multi-mode fiber communications systems having a provision to filter selected modes so as to reduce modal dispersion and thereby increase system carrying capacity, defined as the product of bandwidth multiplied by distance.

BACKGROUND OF THE INVENTION

Many existing short-range optical fiber systems utilize multi-mode fiber (MMF). Multi-mode fiber has been widely used because of its low price, ease of installation, and its specification within several standards, such as the Fiber Data Distribution Interface (FDDI). However, MMF suffers from low bandwidth, and thus can only support transmission at relatively low speeds (tens to hundreds of megabits per second). As 10 Gigabit Ethernet (10 GbE) is increasingly introduced into optical communications networks, the bandwidth limitation of the existing MMF links becomes a new challenge for a network designer to achieve a meaningful transmission distance. The numerical product of bandwidth multiplied by distance, is a useful measure of the data carrying capacity of optical fiber. For example, 62.5 □m MMF has only a 500 Mhz-km bandwidth-distance product for transmission of light signals at 1310 nm and only 160 MHz-km bandwidth-distance product for transmission of light signals at 850 nm. Thus, for 10 Gbit/s Ethernet (10 GbE) applications, the useful propagation distance through MMF is only about 80 meters at 1310 nm and 26 meters at 850 nm.

Modal dispersion is the principal bandwidth-limiting factor in MMF. Light propagates down the fiber core in a stable "path," known as a "mode." Multi-mode fiber supports hundreds of modes in the core, each of which is a different length. An example of light propagation within MMF is shown in FIG. 1. The known multi-mode fiber 100 shown in FIG. 1 comprises a core 104 surrounded by a single cladding 102. The diameter of the core 104 is sufficiently great that multiple transmission modes can propagate along the MMF. Four such modes, 106, 108, 110 and 112, are schematically shown in FIG. 1. If one launches a single pulse of light into the MMF 100, the light will excite and will be transmitted by the various modes, 106–112 and others, all of such modes reflecting, internally within the MMF, at different angles off the core/cladding interface. In other words, the light in each mode will travel a different distance depending on the modal path, so the light in some modes will arrive at the far end of the fiber later than others. For instance, as schematically shown in FIG. 1, light propagating in mode 106 takes the shortest path through the MMF 100 and light propagating in mode 112 takes the longest path through the MMF 100. This phenomenon is known as modal dispersion. If multiple pulses are launched into the fiber 100, they will all suffer such modal dispersion. As a result, adjacent pulses may overlap after a certain transmission distance such that the receiver cannot distinguish one pulse from another, introducing bit errors. In a sharp contrast, single-mode fiber (SMF), used in long-distance fiber-optic communications systems, eliminates the modal dispersion effect because only the propagation of one (fundamental) mode is supported within SMF. This makes SMF work very well for long-distance communications.

Various prior-art solutions have been proposed to extend MMF transmission distance at high data rates. These are briefly discussed in the following paragraphs.

1. Deployment of new fiber. A new generation of so-called "laser optimized multi-mode fiber" has been developed to replace the existing conventional MMF. However, since replacing existing MMF is usually quite expensive, many enterprise customers decide to continue using the existing legacy MMF instead of switching to the new generation fiber.

2. Electrical solution—Electronic Dispersion Compensation. Electronic dispersion compensation (EDC) can be accomplished by a semiconductor chip that performs blind post-detection adaptive equalization on the electrical signal output from the optical detector. This method is still under development and so far only works under certain limited conditions. It also adds complexity and cost to the design of detectors and transceivers deployed in a system using MMF.

3. Optical solution—Restricted Mode Launch. The technique of Restricted Mode Launch (RML), as opposed to overfilled launch (OFL, i.e., uniform excitation of all modes) has been used to minimize modal dispersion in systems employing MMF, by introducing light into only a certain sub-set of all the modes. In a first example of the prior-art RML technique, a light signal is launched into either the fundamental mode or into a limited small set of lowest-order modes to mitigate the modal dispersion. A prior-art system 200 using this technique is schematically shown in FIG. 2. The prior-art system 200 comprises a transmitter 214 producing a light signal, a short section of single-mode fiber (SMF) 202 receiving the light signal from the transmitter 214, a section of multi-mode fiber (MMF) 204 receiving the light signal from the SMF 202 and a receiver 216 at the opposite end of the MMF 204 and receiving the light signal from the MMF 204. The SMF 202 comprises a core 208 surrounded by a cladding 206. The MMF 204 comprises a core 212 surrounded by a cladding 210. In the system 200, restricted mode launch is achieved by coaxially aligning the SMF 202 to the MMF 204 such that axes of both the SMF 202 and MMF 204 coincide along axis 201 and such that the SMF core 208 is optically coupled to the center portion 203 of the MMF core 210. This method is known as a center launch (CL) method. Unfortunately, if there should exist, in the fiber refractive index profile, a localized distinct peak or dip at the core center, which is normal in legacy MMF, the lowest order modes may have largely different propagation times when compared with higher order modes. This results in increased mode dispersion and causes link failure.

In a second example of the RML technique, light is launched into a small number of higher order modes to minimize the modal dispersion and, thus, to increase the transmission distance. This technique is described in the paper by M. Webster, et al., "A statistical analysis of conditioned launch for gigabit Ethernet links using multi-mode fiber," J. of Lightwave Technology, pp. 1532, vol. 17, no. 9, 1999. Typically, a mode conditioning patch cord, is used to excite higher-order modes through the technique of offset launch (OSL). Unfortunately, this technique only works for data transmission rates that are less than 1 to 2 Gbit/s.

4. Optical solution—center launch and mode filtering upon reception. Restricted mode launch alone (described above) is not an ultimate solution as it only works under certain conditions of uniform modal dispersion, whereas the modal dispersion along the legacy fiber is highly unpredictable. The modal dispersion can be reduced to virtually zero, however, if the receiver is permitted to detect only one mode. A prior-art system 300 employing this technique is shown in FIG. 3. The prior-art system 300 comprises a transmitter 214 producing a light signal 301, a first short section of single-mode fiber (SMF) 202 receiving the light signal 301 from the transmitter 214, a section of multi-mode fiber (MMF) 204 receiving the light signal 301 from the SMF 202, a second short section of SMF 202b at the opposite end of the MMF 204 and receiving the light signal 301 from the MMF 204 and a receiver 216 receiving the light signal 301 from the SMF 202b. The SMF 202 comprises a core 208 surrounded by a cladding 206. The MMF 204 comprises a core 212 surrounded by a cladding 210. The second SMF 202b comprises a core 208b surrounded by cladding 206b. As shown in FIG. 3, with a center launch condition, the second SMF 202b is used to filter out higher order modes before the light hits the receiver 216. In this case, the receiver will detect only the fundamental mode. The SMF-MMF alignment is achieved with a mechanical splice. Although the center launch scheme combined with mode filtering (FIG. 3) introduces little loss of the optical signal at the transmitter side, high attenuation is often observed at the receiving splice due to the mode field diameter mismatch from MMF to SMF.

The bandwidth-distance product of a MMF system is increased by selectively propagating only a limited number of modes through the MMF link. Ideally, the modal dispersion is eliminated if only one mode propagates. A SMF, as implied by its name, can filter out all higher order modes of the MMF when centrally coupled to the MMF, and allows only the fundamental mode to reach the detector. However, due to the mismatch of the core diameters, it is expected that direct coupling from a MMF to a SMF will result in high attenuation. The attenuation can be estimated by $$IL(dB) = -10\log\left[\left(\frac{D_2}{D_1}\right)^2\right]$$

where $D_1$ and $D_2$ are the core diameters of the MMF and the SMF, respectively. For example, an over-filled (uniform excitation of all modes) 62.5 μm ($D_1$) MMF and a 9 μm ($D_2$) SMF cause an insertion loss as high as 16.8 dB.

The insertion loss can be made lower than described by the above equation under the condition of center launch with a SMF. Under this condition, the main contribution to the attenuation is the mismatch of the mode field diameter of the fundamental modes in the two fibers, and can be estimated by $$IL(dB) = -10\log\left[\frac{4}{\left(\frac{\omega_2}{\omega_1} + \frac{\omega_1}{\omega_2}\right)^2}\right]$$

where $\omega_{1,2}$ is the mode field diameters of the fundamental modes in two fibers, respectively. In a technical article by Z Haas, and M. A. Santoro, titled "A mode filtering scheme for improvement of the bandwidth-distance product in multi-mode fiber system," (J. of Lightwave Technology, pp. 1125, vol. 11, no. 7, 1993), an insertion loss of approximately 5–6 dB was observed after 2 km transmission. We have observed about 2–3 dB attenuation after a MMF link of 300 m (the target distance for 10 Gbit/s Ethernet applications).

Obviously, MMF to SMF coupling loss translates directly into power penalty, and demands a larger power budget in the design of a transmission system using MMF.

In view of the above-described difficulties of prior-art techniques for using multi-mode fiber at both high bit rates and relatively long distances, there is a need in the art for an improved system and method for a mode filtering optical coupler for multimode fiber-optic transmission systems. The present invention addresses such a need.

SUMMARY OF THE INVENTION

The present invention provides a multi-mode fiber optical communications system utilizing an MMF to SMF coupler with very low insertion loss. Applying such couplers into a high data rate MMF transmission system not only significantly improves the system bandwidth, but also relaxes the requirements for the optical components and thus lowers the overall device cost. A first embodiment of a fiber-optic communications system in accordance with the present invention comprises a multi-mode waveguide carrying an optical signal, a single-mode waveguide optically coupled to and receiving the optical signal from the multi-mode waveguide and an adiabatic coupler optically coupled between the multi-mode waveguide and the single-mode waveguide. Another embodiment of a fiber-optic communications system in accordance with the invention comprises a transmitter providing an optical signal, a single-mode waveguide optically coupled to and receiving the optical signal from the transmitter, a multi-mode waveguide optically coupled to and receiving the optical signal from the single-mode fiber, and an adiabatic coupler optically coupled between the single-mode waveguide and the multi-mode waveguide. The multi-mode waveguide and the single-mode waveguide may be optical fibers, planar waveguides or any other suitable waveguide. The adiabatic coupler may comprise a tapered core surrounded by a cladding or, alternatively, may comprise a core surrounded by a cladding, wherein the refractive index of at least one of the core and the cladding varies over the length of the adiabatic coupler and the diameter of the core is either constant or non-constant. In another aspect, the invention is a method of fabricating an adiabatic coupler for coupling a multi-mode fiber to a single-mode fiber comprising the steps of (a) splicing an end of the multi-mode fiber to an end of the single-mode fiber; (b) heating the splice with a heat source; and (c) pulling apart the multi-mode fiber and the single-mode fiber while heating the splice such that the splice is drawn out into a region with a tapered core, the taper of the core configured such that a fundamental mode of a light will propagate adiabatically through the tapered core.

BRIEF DESCRIPTION OF THE DRAWINGS

The object and features of the present invention can be more fully understood and better appreciated with reference to the attached drawings, wherein

FIG. 5 is a diagram of filtering of higher order modes by the adiabatic coupler of FIG. 4a;

DETAILED DESCRIPTION OF THE PREFERRED EMBODIMENTS

The present invention provides an improved apparatus and method for an adiabatic taper coupler for use within optical communications systems that utilize multi-mode optical fiber. The following description is presented to enable one ordinary skill in the art to make and use the invention and is provided in the context of a patent application and its requirements. Various modifications to the preferred embodiments will be readily apparent to those skilled in the art and the generic principles described herein may be applied to other embodiments. Thus, the present invention is not intended to be limited to the embodiments shown but is to be accorded the widest scope consistent with the principles and features described herein. In order to gain a detailed understanding of the invention, the reader is referred to the appended FIGS. 4–9 in conjunction with the following description. It is to be understood that the drawings are diagrammatic and schematic representations only and are neither limiting of the scope of the present invention nor necessarily drawn to scale.

Figure 4A:
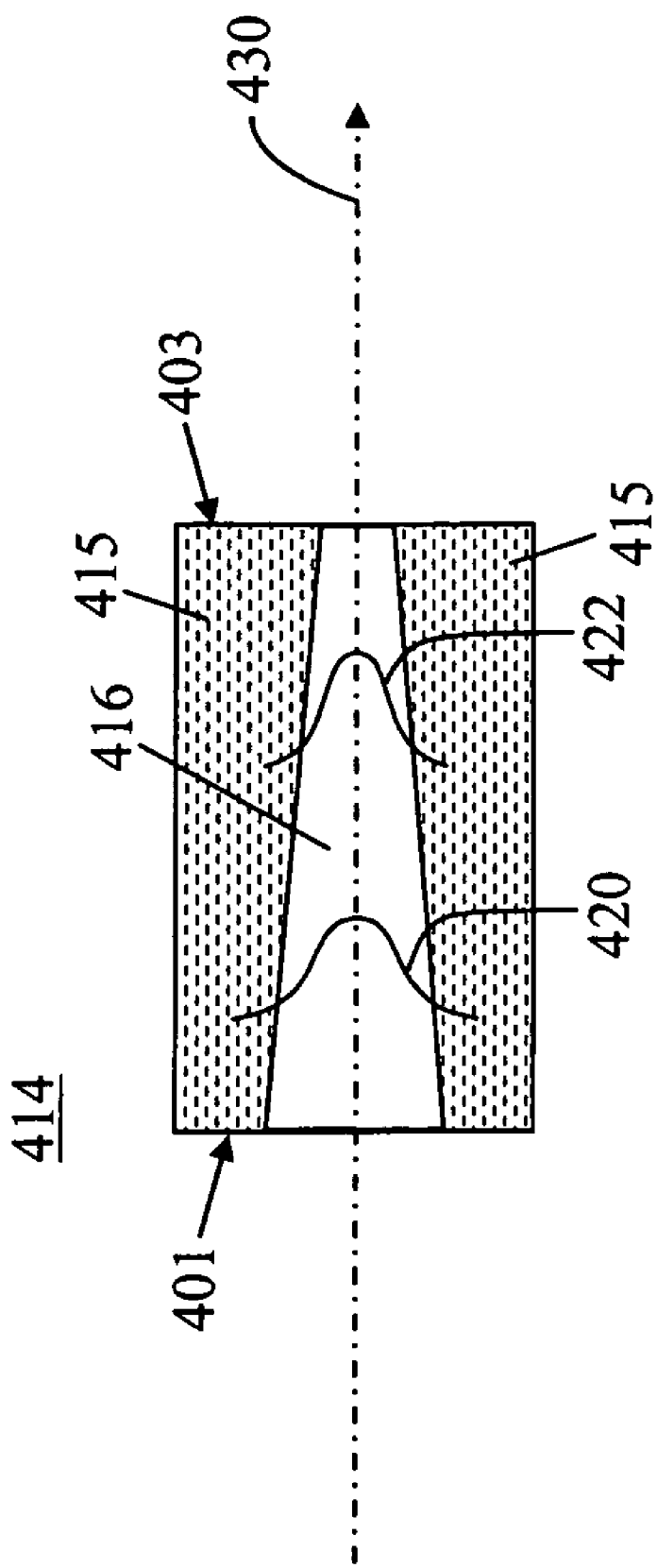
FIG. 4a is a schematic diagram of an MMF to an SMF adiabatic taper coupler, according to one embodiment of the invention.
Figure 4B:
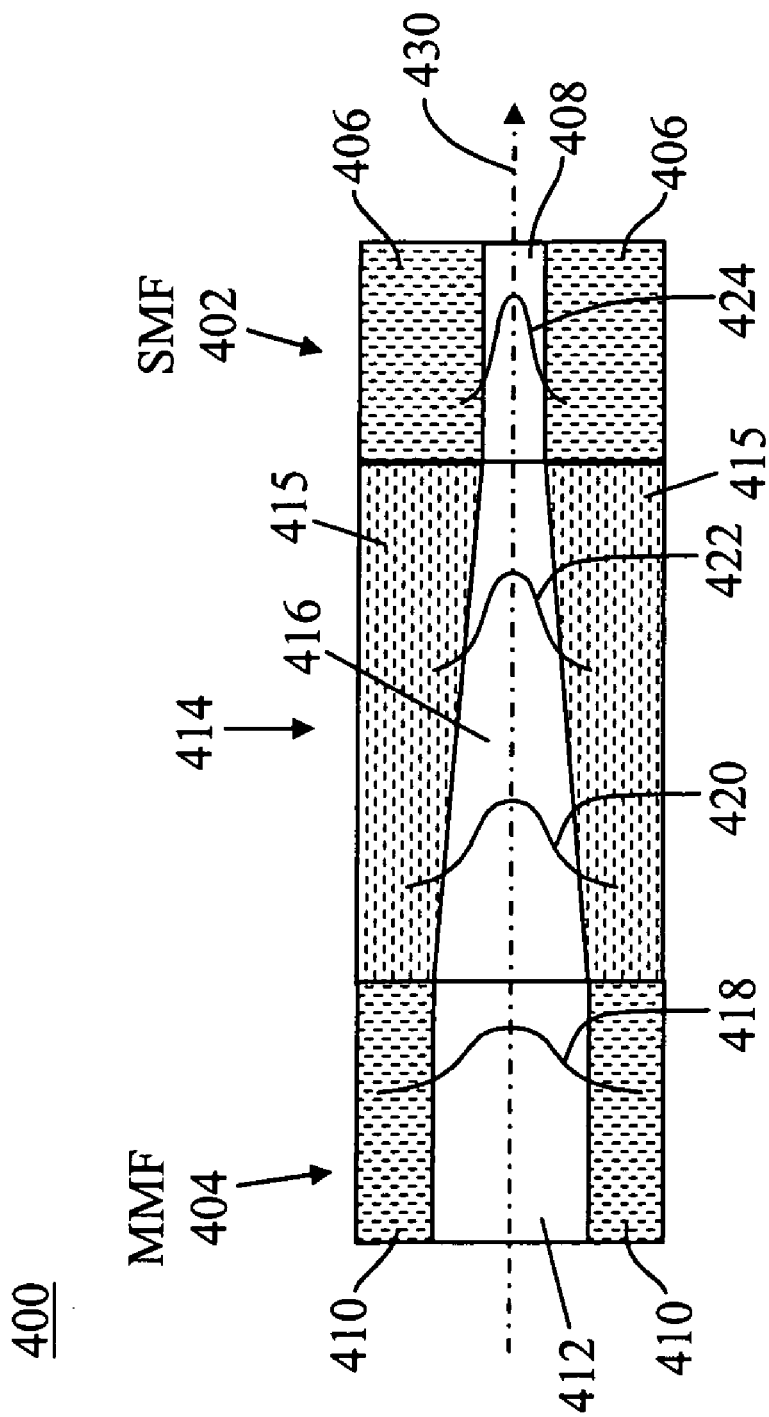
FIG. 4b is a schematic diagram of a fiber-optic system utilizing the adiabatic taper coupler of FIG. 4a, according to one embodiment of the invention.

FIG. 4a shows a first example of an adiabatic coupler 414, according to one embodiment of the invention, and FIG. 4b shows a multi-mode fiber-optic system 400 that utilizes the adiabatic coupler 414, according to one embodiment of the invention. Within the multi-mode fiber-optic system 400, the adiabatic coupler 414 is inserted between a MMF 404 and a SMF 402 to optically couple light from the MMF 404 to the SMF 402. The adiabatic coupler 414 comprises a tapered core 416 surrounded by a cladding 415. The MMF 404 comprises a uniform diameter core 412 surrounded by a cladding 410 and the SMF 402 comprises a uniform diameter core 408 surrounded by a cladding 406.

As shown in FIG. 4a, the taper of the core 416 of the adiabatic coupler 414 is configured such that the diameter of the core 416 at a first end 401 is equal to the diameter of the core 412 of the MMF 404 and the diameter of the core 416 at a second end 403 is equal to the diameter of the core 408 of the SMF 402. As a result, the diameter of the core 416 at the first end 401 is greater than the diameter of the core 416 at the second end 403. As shown in FIG. 4b, the MMF 404 is optically coupled to the first end 401 of the adiabatic coupler 414 and the SMF 402 is optically coupled to the second end 403 of the adiabatic coupler 414. The diameter of the core 416 decreases slowly and evenly from the first end 401 to the other end 403 so that the fundamental mode 418 in the MMF 404, when launched into the adiabatic coupler 414 from the first end 401, evolves along the adiabatic coupler 414 into a mode field diameter that substantially matches that of the fundamental mode 424 in the SMF 402.

Representations of the fundamental mode within the coupler 414 are shown at 420 and 422. The taper of the core 416 is such that the transmission of the fundamental mode through the coupler is adiabatic. Adiabatic transfer means propagation of a particular mode through a region without transfer of energy to any other modes. In other words, the optical power carried by this particular mode is conserved through the transition and there is no interaction between modes. The equation below is the requirement for the taper length to meet the adiabatic condition. If the fundamental mode propagation constant along the propagation direction z is denoted by $\beta(z)$, then the adiabatic condition holds if, at any two positions, $z_1$ and $z_2$, $$|z_1 - z_2| > \frac{2\pi}{\beta(z_1) - \beta(z_2)}$$

The coupling loss of the fundamental mode due to profile mismatch is thus essentially zero under the adiabatic transmission condition.

As previously described, with a conventional apparatus satisfying the center launch condition, there may exist some higher order modes propagating through the multi-mode fiber due to mode mixing caused by impurity of the fiber, refractive index irregularities, misaligned connectors, etc. However, the adiabatic coupler 414 within the system 400 of the present invention transports any such higher order modes to the cladding 415. Subsequently, most of the optical power carried in these higher order modes is either radiated out of the fiber or absorbed by the cladding coating. This property is schematically illustrated for two representative higher order modes 432a–432b in FIG. 5. As shown, only the fundamental mode 430 travels completely through the adiabatic coupler 414 from the MMF 404 to the SMF 402 without loss. Hence, the adiabatic coupler 414 also serves as a mode filter. Further, the SMF 402 also functions as a one-mode filter to strip out all remaining higher order modes such that only the fundamental mode propagates through the SMF 402 to the detector (not shown).

Figure 5:
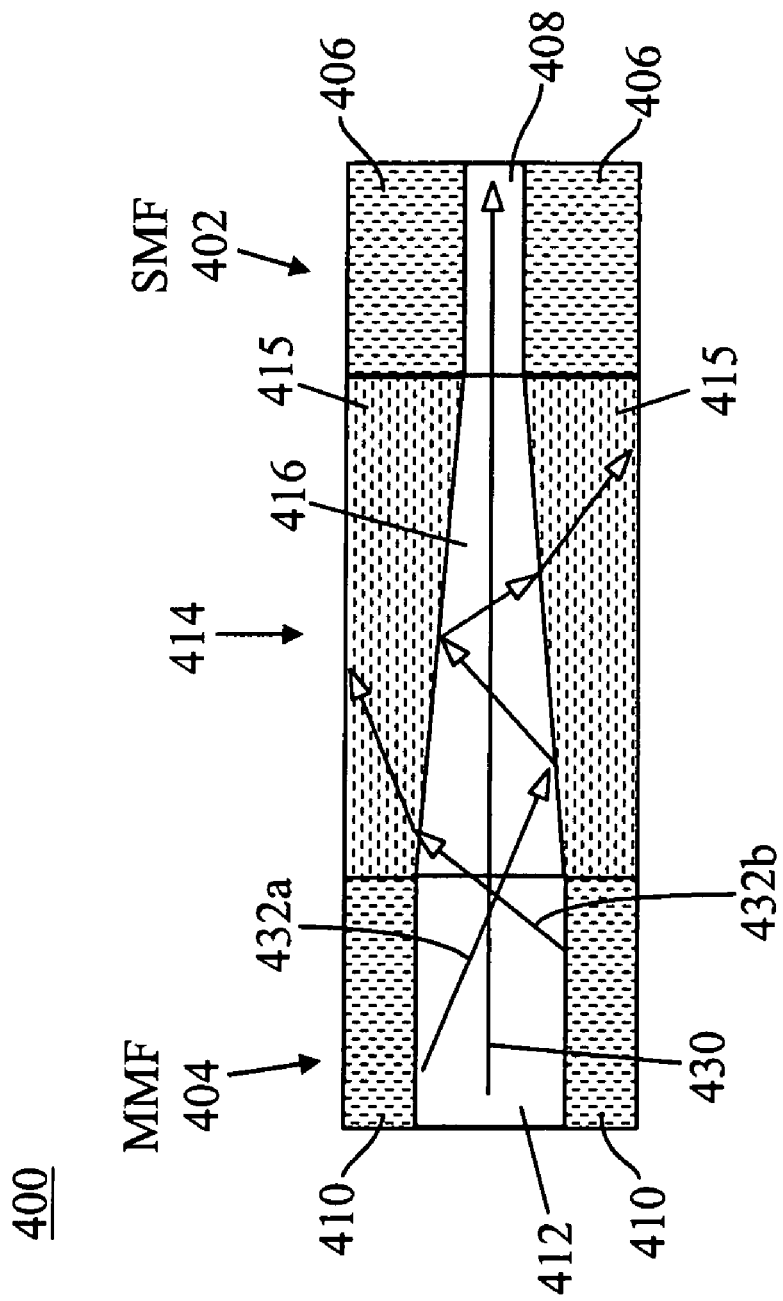

In summary, the adiabatic coupler 414 transfers the fundamental mode in the MMF 404 to the SMF 402 with substantially zero loss. One source of attenuation in the transfer from the MMF 404 to the SMF 402 is the filtering of higher-order modes as shown in FIG. 5. As a consequence, mode noise from higher order modes at the receiver is substantially reduced. Although the excitation of higher order modes during the transmission through MMF 404 is almost inevitable, given a fixed link, the optical power carried by the higher order modes caused, for instance, by a butt-coupling center launch scheme, can be minimized at the receiver.

Figure 6:
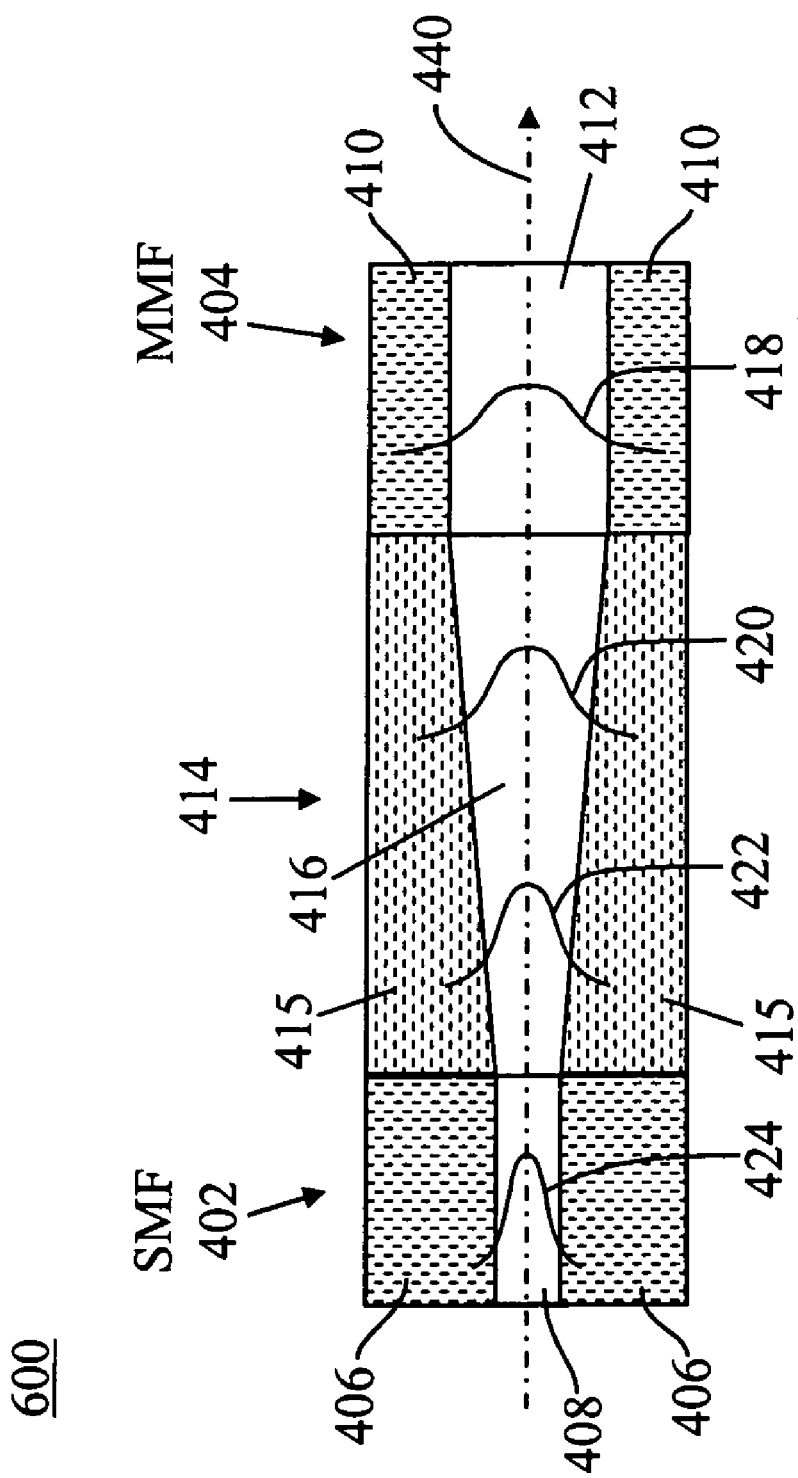
FIG. 6 is a schematic diagram of a fiber-optic system utilizing the adiabatic taper coupler of FIG. 4a, according to an alternative embodiment of the invention.

FIG. 6 shows a fiber-optic system 600, according to an alternative embodiment of the invention. The system 600, comprises all the same components of the system 400—the SMF 402 comprising a core 408 and a cladding 406, the adiabatic coupler 414 optically coupled to the SMF 402 and comprising a tapered core 416 and a cladding 415 and the MMF 404 optically coupled to the adiabatic coupler 414 and comprising a core 412 and a cladding 410. The only difference between the system 600 and the previously described system 400 is that, in the system 600, an optical mode 440 propagates from the SMF 402 through the adiabatic coupler 414 to the MMF 404. This is the reverse of the propagation of the optical mode in the system 400. The adiabatic coupler 414, when used at the launch as shown in FIG. 6, performs the function of exclusively launching the light into the fundamental mode of the MMF with substantially zero attenuation.

Figure 7A:
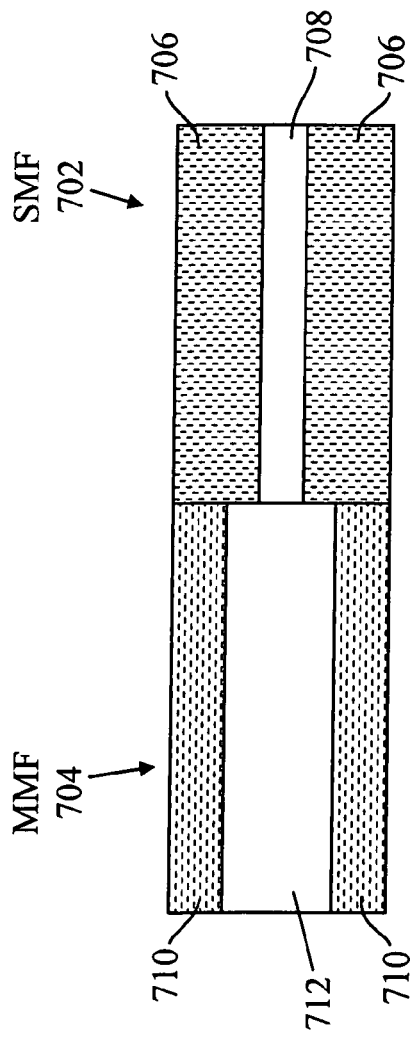
FIGS. 7a and 7b illustrate a method of fabricating an MMF-SMF taper coupler, according to one embodiment of the invention.
Figure 7B:
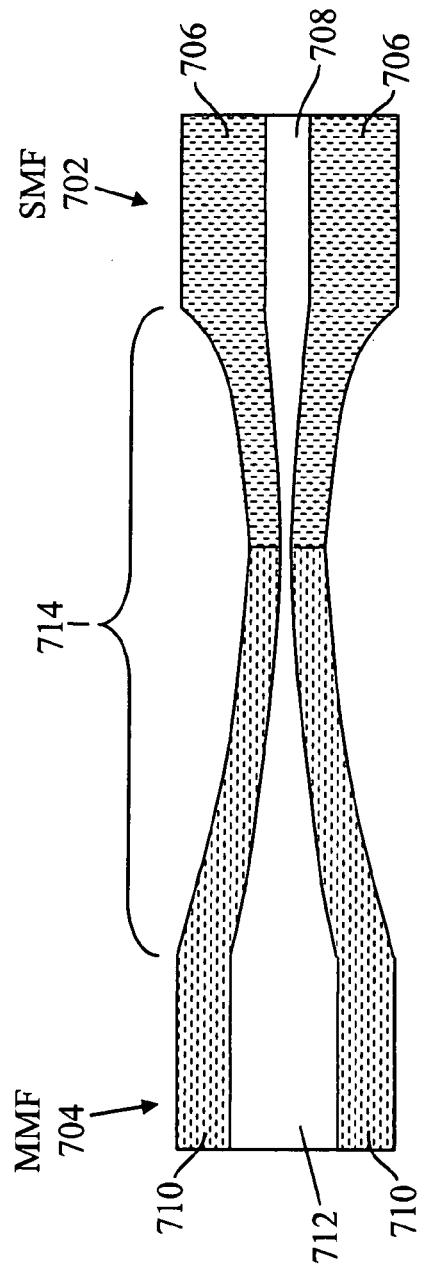

FIGS. 7a–7b illustrate a method of fabricating an MMF-SMF taper coupler, according to one embodiment of the invention. In the first step of the method, an MMF 704 and an SMF 702 are spliced together as shown in FIG. 7a. The MMF 704 comprises a core 712 of a first diameter surrounded by a cladding 710. The SMF 702 comprises a core 708 of a second diameter that is less than the first diameter, and the core 708 is surrounded by a cladding 706. After splicing of the MMF 704 to the SMF 702, the splice is heated using a heat source, and, at the same time, the two spliced fibers, 704 and 702, are slowly pulled apart to form a taper region 714 between the MMF 704 and the SMF 702. If the stretching process is slow enough, the taper is adiabatic, and the fundamental mode in the MMF 704 can be converted into the fundamental mode in SMF 702, or vice-versa, along the taper with nearly zero loss. The heat source may be a hydrogen torch, a $CO_2$ laser or any other type of technically feasible heat source.

The wavelength, the fiber core dimension, and the refractive indices of the core and the cladding determine the mode field diameter. As previously described, the adiabatic coupler 414 of FIG. 4a converts the fundamental mode in a MMF into a fundamental mode in an SMF by gradually varying the core dimension. Similarly, this conversion can be accomplished by gradually varying the refractive index contrast between the core and the cladding. Such an adiabatic coupler is referred to herein as a Graded Refractive Index MMF-SMF coupler.

Figure 8A:
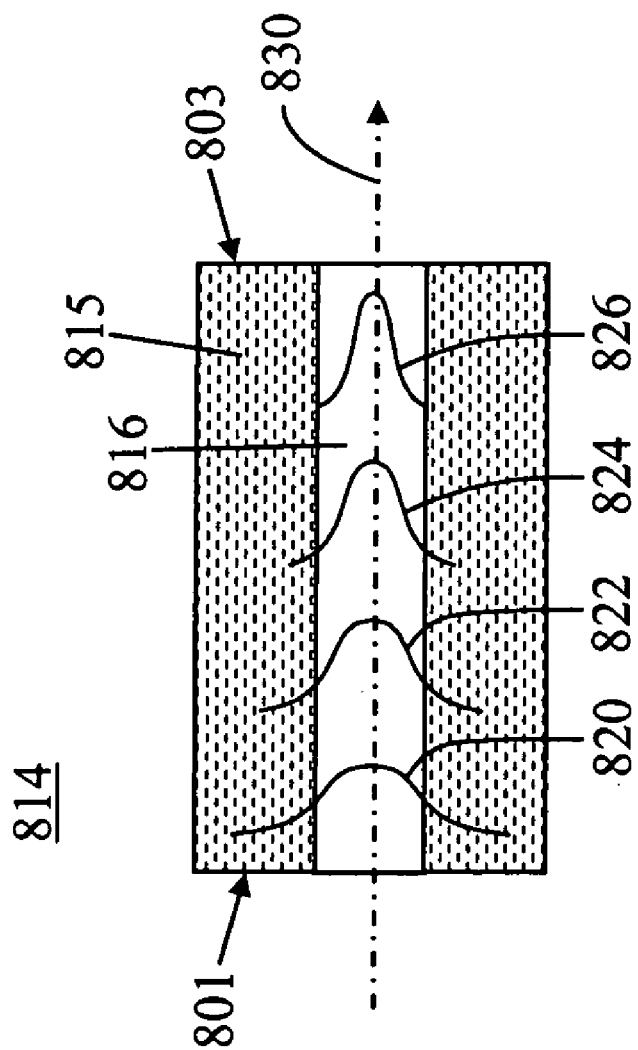
FIG. 8a is a schematic diagram of a Graded Refractive Index MMF-SMF coupler, according to one embodiment of the invention.

FIG. 8a illustrates a suitable Graded Refractive Index MMF-SMF coupler 814, according to one embodiment of the invention. As shown, the Graded Refractive Index MMF-SMF coupler 814 comprises a core 816 surrounded by a cladding 815, wherein the refractive index of either the core or the cladding varies along the length of the coupler 814. As a result of the refractive index variations, the mode-field diameter, shown schematically at 820, 822, 824 and 826, of the fundamental mode 830 within the coupler gradually decreases along the direction from a first end 801 to second end 803.

Figure 8B:
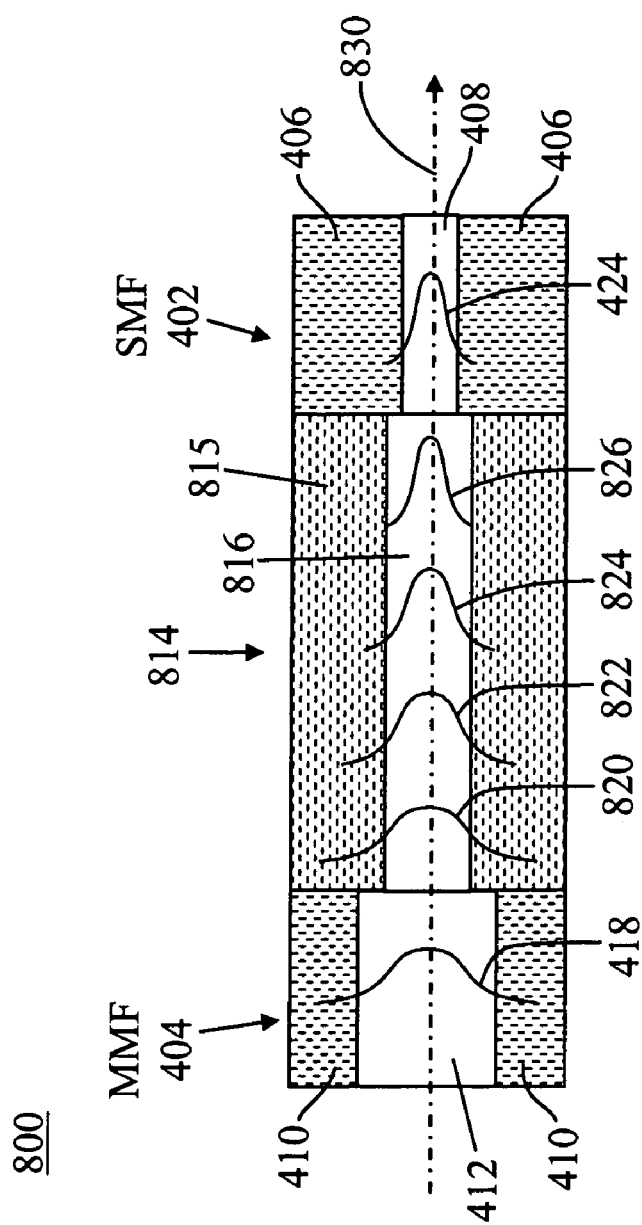
FIG. 8b is a schematic diagram of a fiber-optic system utilizing the Graded Refractive Index MMF-SMF coupler of FIG. 8a, according to one embodiment of the invention.

FIG. 8b illustrates a fiber-optic system 800 utilizing the Graded Refractive Index MMF-SMF coupler 814 of FIG. 8a, according to one embodiment of the invention. Within the system 800, the MMF 404 and the SMF 402 are as previously described in conjunction with FIGS. 4a–4b. However, in the system 800, the Graded Refractive Index MMF-SMF coupler 814 is optically coupled between the MMF 404 and the SMF 402 such that the MMF 404 is optically coupled to the first end 801 of the adiabatic coupler 814 and the SMF 402 is optically coupled to the second end 803 of the adiabatic coupler 814. The refractive index variation, in either the cladding 815 or the core 816, along the length of the coupler 814 is gradually changed such that the mode field 820 of the mode supported at the first end 801 of the coupler 814 substantially matches the mode field 418 of the fundamental mode in the MMF 404, and the mode field 826 supported at the second end 803 of the coupler 814 substantially matches the mode field 424 of the fundamental mode in SMF 402.

In the embodiments of FIGS. 8a and 8b, the mode field diameter is a function of the core dimension, and the waveguide refractive index contrast. Change of either core dimension or refractive index contrast, or both will modify the mode field diameter along the mode propagation direction. Furthermore, the propagation constant of a mode $\beta(z)$ is also a function of wavelength, core diameter, refractive indices and their contrast. Thus, any change in core diameter or refractive indices along the taper should be sufficiently gradual that the adiabatic condition $$|z_1 - z_2| > \frac{2\pi}{\beta(z_1) - \beta(z_2)}$$

holds.

One effective way to fabricate the Graded Refractive Index MMF-SMF coupler 814 is to implant impurities (dopants) into the cladding of an ordinary fiber so as to adjust the cladding refractive index. The dopants can be implanted by any known process, such as ion implantation, chemical vapor deposition (CVD), or the like. In addition, the diameter of the core 816 may be chosen to be any appropriate value; however, the diameter does not have to be constant along the length of the coupler 814.

Figure 1:
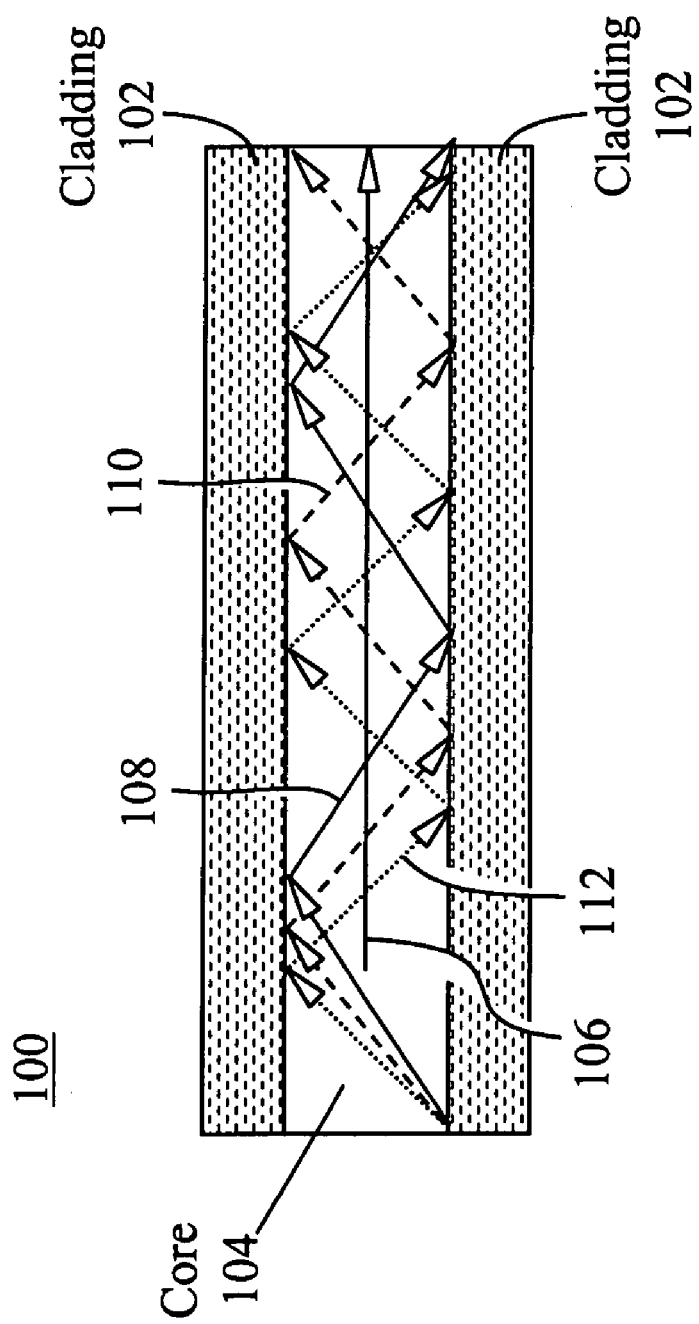
FIG. 1 is an illustration of modal dispersion in step-index multimode fiber.
Figure 2:
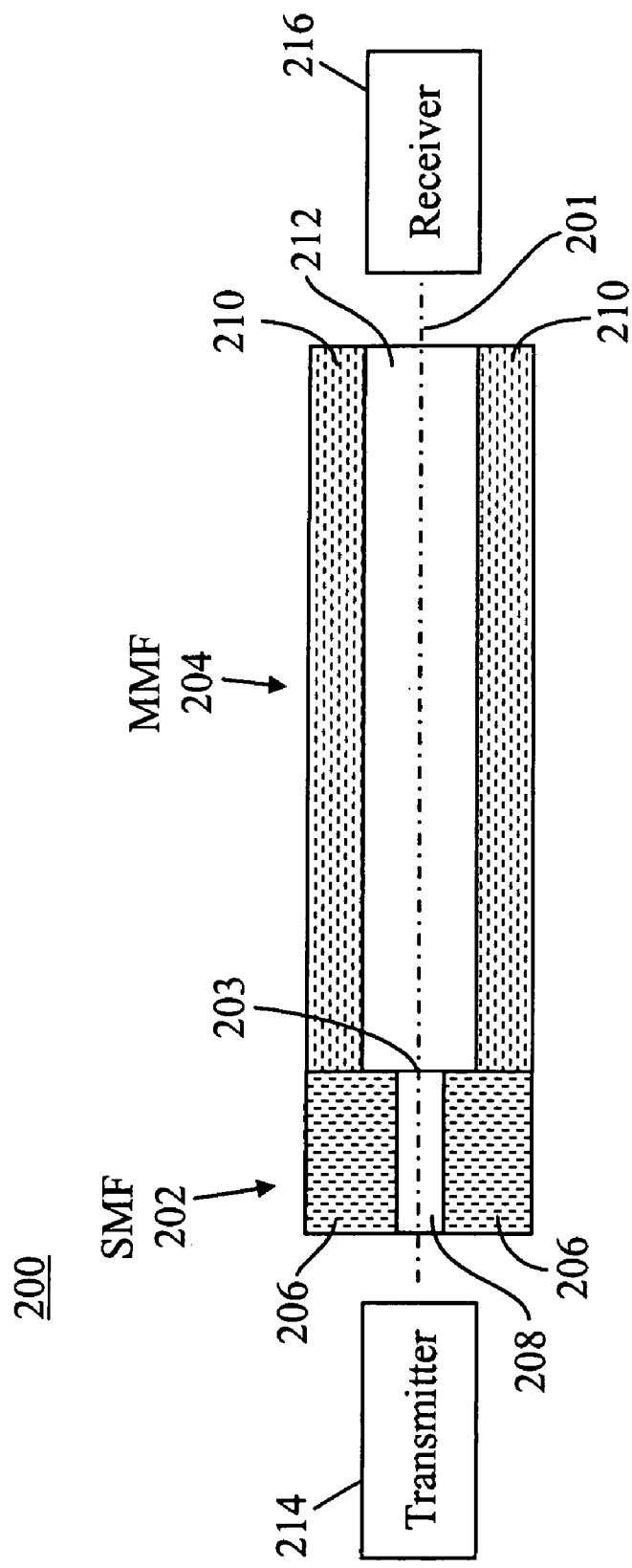
FIG. 2 is an illustration of a prior-art apparatus using Restricted Mode Launch, wherein a single-mode fiber is coaxially aligned to a multimode fiber.
Figure 3:
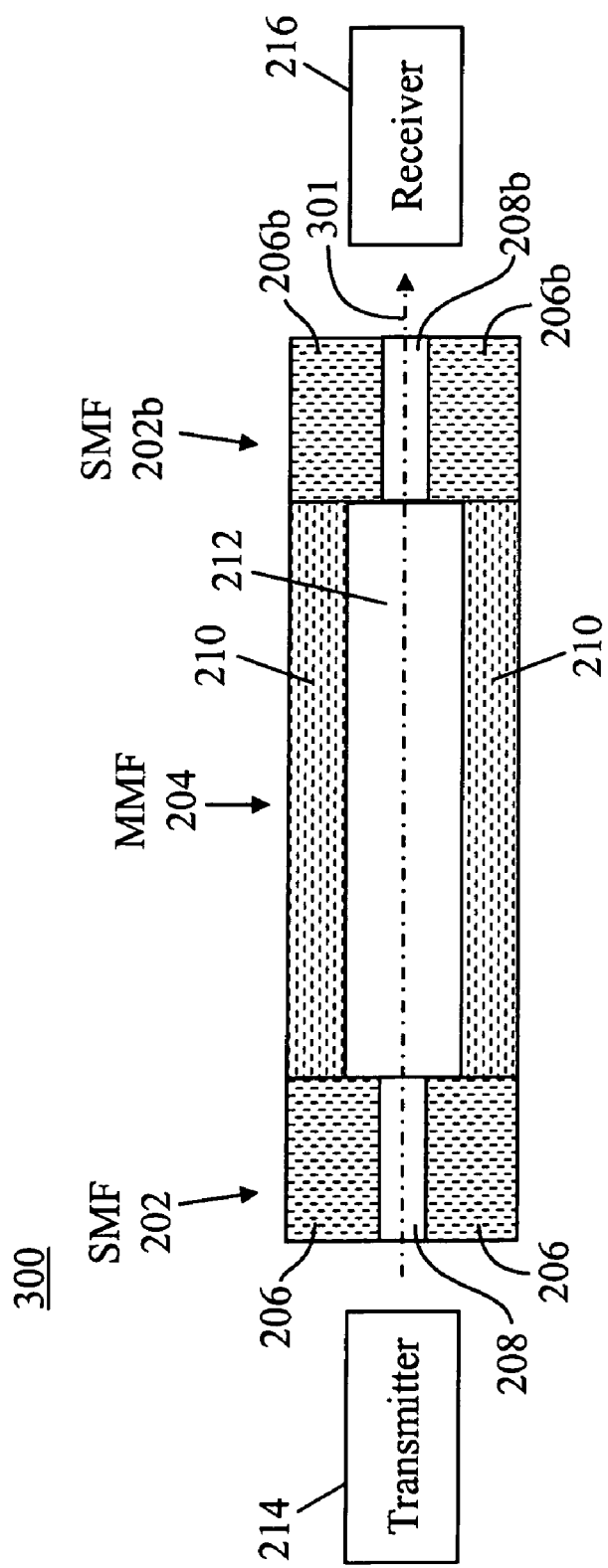
FIG. 3 is an illustration of a prior-art apparatus using a combination of Center Launch and mode filtering.
Figure 9A:
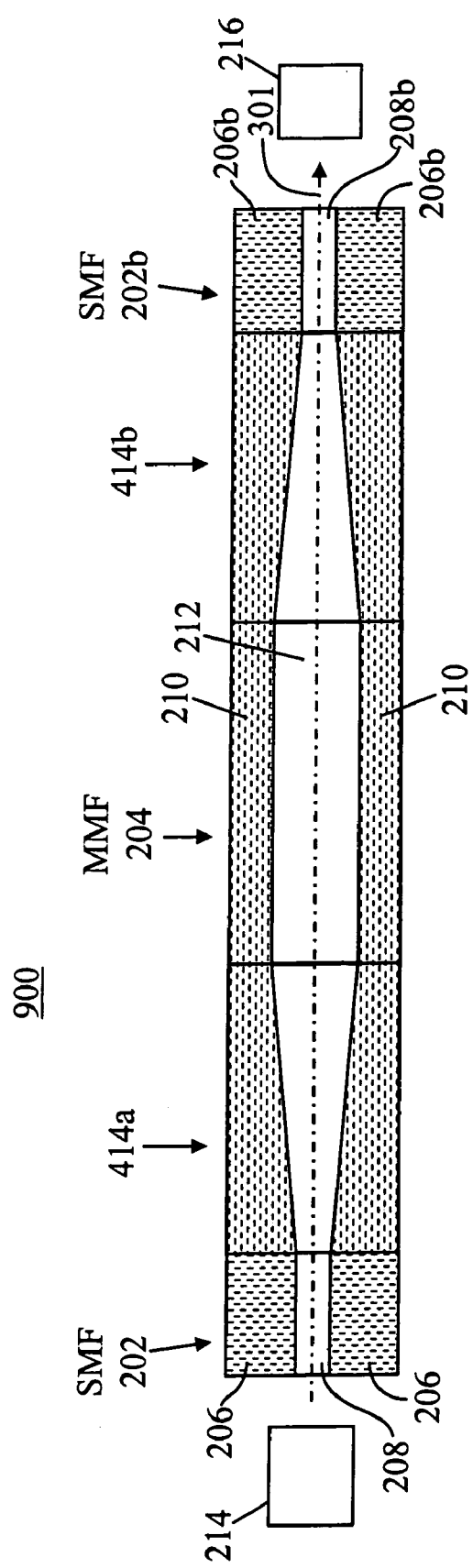
FIG. 9a is a schematic diagram of a fiber-optic system, according to an alternative embodiment of the invention.

FIG. 9a is a schematic diagram of a fiber-optic system 900, according to an alternative embodiment of the invention. As shown, the fiber-optic system 900 comprises all the components, referenced with the same respective numbers, already shown in FIG. 3 and described in reference thereto. The fiber-optic system 900 further comprises a first adiabatic coupler 414a optically coupled between the SMF 202 and the MMF 204 and a second adiabatic coupler 414b optically coupled between the MMF 204 and the second SMF 202b. Although the adiabatic couplers 414a, 414b are shown in FIG. 9a are of the tapered-core type, a Graded Refractive Index MMF-SMF coupler may replace one or both adiabatic couplers 414a, 414b. The first adiabatic coupler 414a transmits optical energy of the light signal 301 into a fundamental mode of the MMF 202b. The second adiabatic coupler 414b permits a fundamental mode of the light signal 301 to propagate from the MMF 204 to the second SMF 202b and, ultimately, to the receiver 216.

Figure 9B:
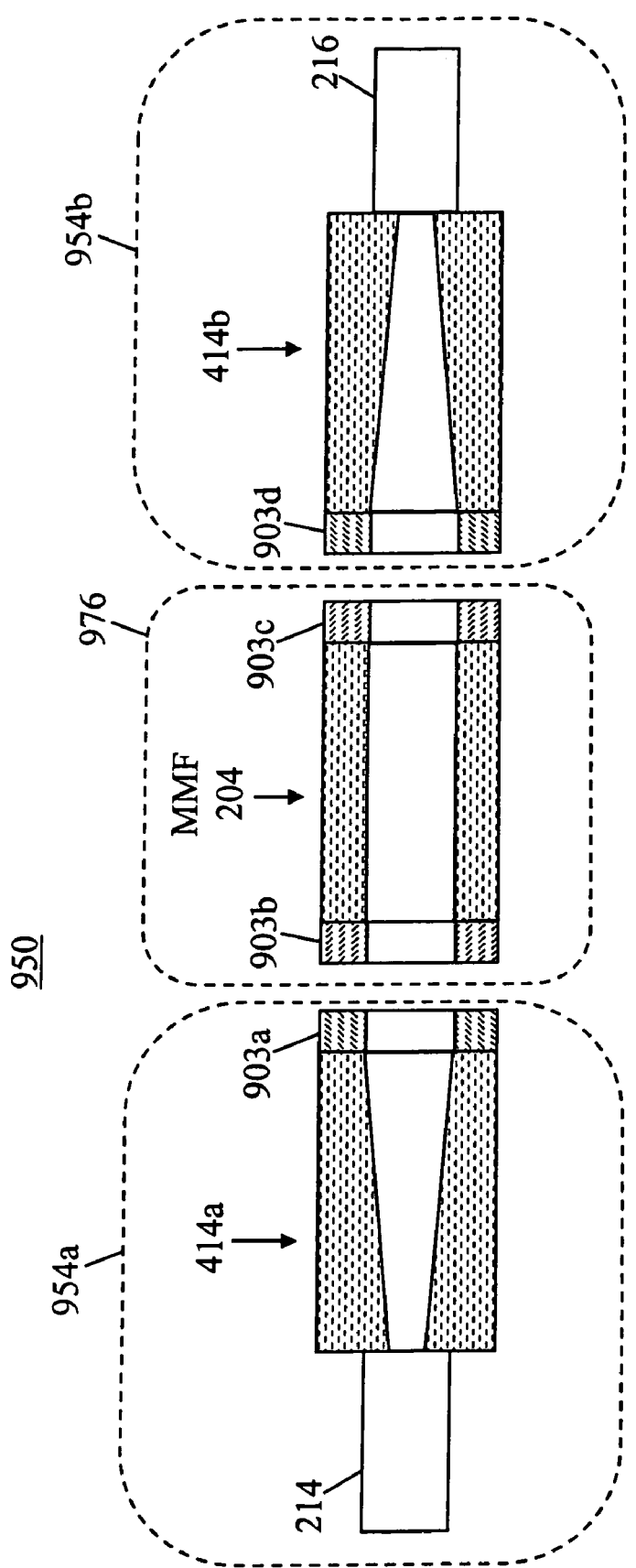
FIG. 9b is a schematic diagram of a fiber-optic system, according to an alternative embodiment of the invention.

FIG. 9b is a schematic diagram of a fiber-optic system 950, according to an alternative embodiment of the invention. As shown, the fiber-optic system 950 operates similarly to and comprises all the components of the system 900 of FIG. 9a and described in reference thereto. However, in the system 950, the first adiabatic coupler 414a is part of a single physical unit or module 954a that includes the transmitter 214, and the second adiabatic coupler 414b is part of a second physical unit or module 954b that includes the receiver 216. The modules 904a, 904b may be portable or replaceable optical or opto-electronic modules. The module 904a may be a Transmitter Optical Sub-Assembly (TOSA), as is known in the art. Likewise, the module 904b may be a Receiver Optical Sub-Assembly (ROSA), as is also known in the art. Preferably, the modules 954a, 954b are optically coupled to the span of multi-mode fiber 204 by conventional connecting means, such as fiber connectors 903a–903d that are affixed to the ends of the adiabatic couplers 414a, 414b and to the ends of the multi-mode fiber 204. The fiber connectors 903b, 903c and the MMF 204 (where the fiber connectors 903b, 903c are affixed to the ends of the MMF 204) together comprise a fiber-optic cable or "patch cord" 976. The adiabatic couplers 414a, 414b that are integrated with the transmitter (receiver) into a TOSA (ROSA), are preferably in the form of non-fiber or non-cylindrical waveguides, such as planar waveguides, in order to preserve a small footprint. Although connectors 903a–903d are described as conventional fiber connectors, it should be understood that any suitable connecting means, such as fused couplers, splices and the like, may be used.

Figure 9C:
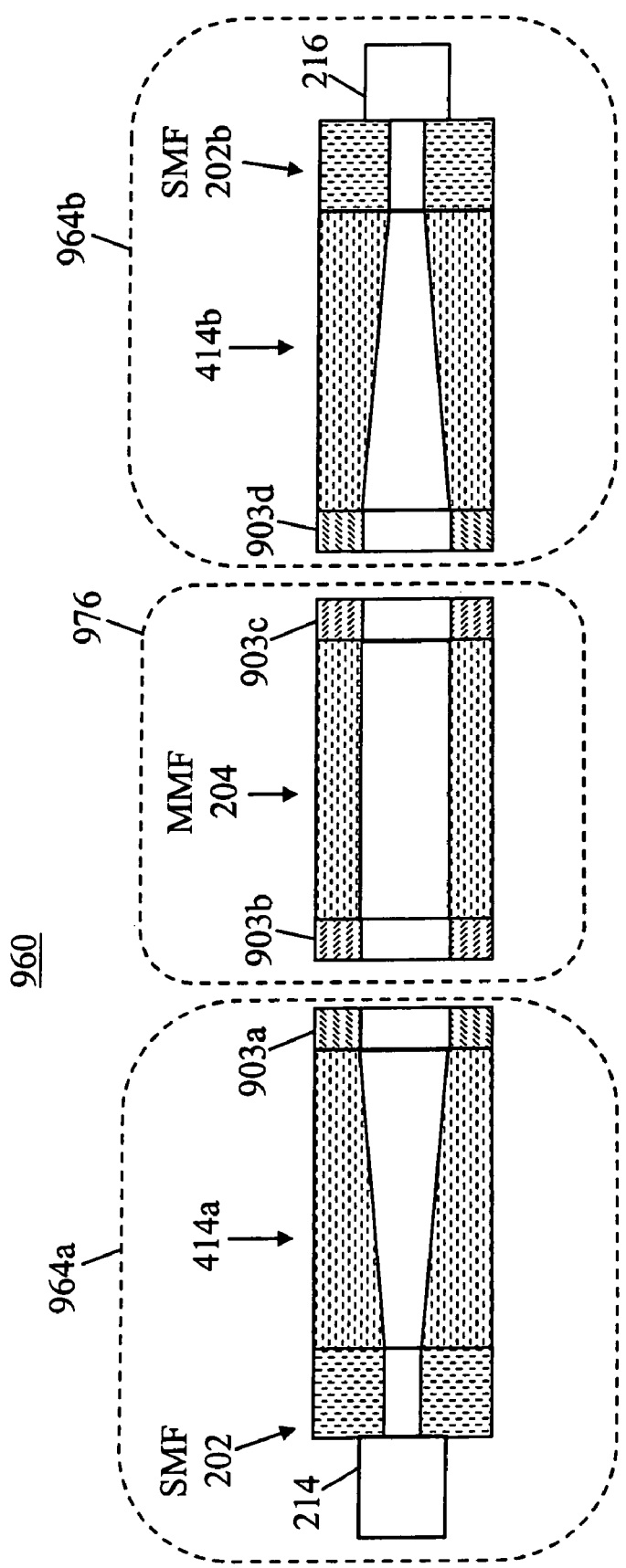
FIG. 9c is a schematic diagram of a fiber-optic system, according to an alternative embodiment of the invention.

FIG. 9c is a schematic diagram of a fiber-optic system 960, according to an alternative embodiment of the invention. As shown, the fiber-optic system 960 is similar to the system 950 of FIG. 9b except that additional short lengths of single-mode fiber 202a and 202b are optically coupled between the adiabatic coupler 414a and the transmitter 214 and between the adiabatic coupler 414b and the receiver 216, respectively. The single mode fibers 202a, 202b facilitate optical coupling in cases where the adiabatic couplers 414a, 414b are fiber-based or of cylindrical shape.

Figure 9D:
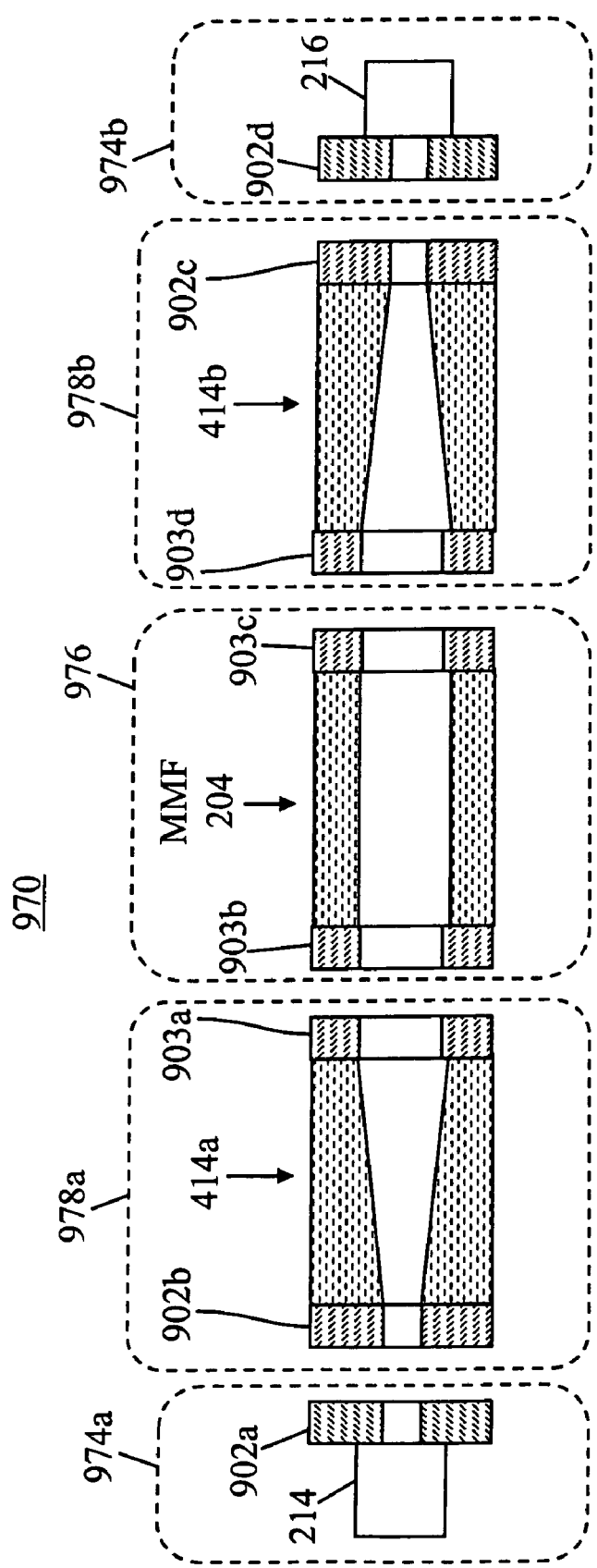
FIG. 9d is a schematic diagram of a fiber-optic system, according to an alternative embodiment of the invention.

FIG. 9d is a schematic diagram of a fiber-optic system 970, according to an alternative embodiment of the invention. Similarly to the system 950 of FIG. 9b, the system 970 comprises separate modules 974a, 974b, which include the transmitter 214 and the receiver 216, respectively, and may be independently removable or replaceable physical units. The system 970 differs, however, from the system 950 through the provision of the adiabatic couplers 414a, 414b within respective stand-alone fiber-optic cables or "patch cords" 978a, 978b. The multi-mode fiber-optic cable or patch cord 976 is optically coupled between the two fiber-optic cables 978a, 978b.

The fiber-optic cables 978a, 978b within the system 970 further include connectors 902b, 902c, respectively, affixed to the single-mode ends of the adiabatic couplers 414a, 414b and connectors 903a, 903c, respectively, affixed to the multi-mode ends of the adiabatic couplers 414a, 414b. The modules 974a, 974b include respective connectors 902a and 902d, or other suitable conventional connecting means, to facilitate optical coupling of these modules to the fiber-optic cables 978a, 978b.

Preferably, the multi-mode fiber-optic cable 976 includes conventional connectors 903b, 903c affixed to either end of the multi-mode fiber 204 to facilitate optical coupling between the multi-mode fiber-optic cable 976 and each of the fiber cables 978a, 978b. More generally, however, the multi-mode ends of the adiabatic couplers 414a, 414b are coaxially optically coupled to the MMF 204. The components facilitating or accomplishing such coaxial couplings need not be limited to the connectors shown but could be, alternatively, splices, fusion couplers, or the like. The single-mode ends of the adiabatic couplers 414a, 414b are optically coupled to a single-mode transmitter 214 (such as a laser source) and to the receiver 216 (i.e., a detector). In general, the components used to facilitate or accomplish these couplings need not be limited to the connectors shown but could, alternatively, be realized by, free-space lens systems, waveguide couplings, or the like. Advantageously, the system 970 provides for easy modification of an existing MMF communication system or link by enabling the fiber cables or patch cords 978a, 978b to be easily inserted into the system. In other words, the transmitters, receivers and/or transceivers and the multi-mode fiber-optic cable 976 of the existing communications media (MMF system or link) remain unchanged when deploying the adiabatic-coupler-bearing fiber cables 978a, 978b into the system.

Figure 9E:
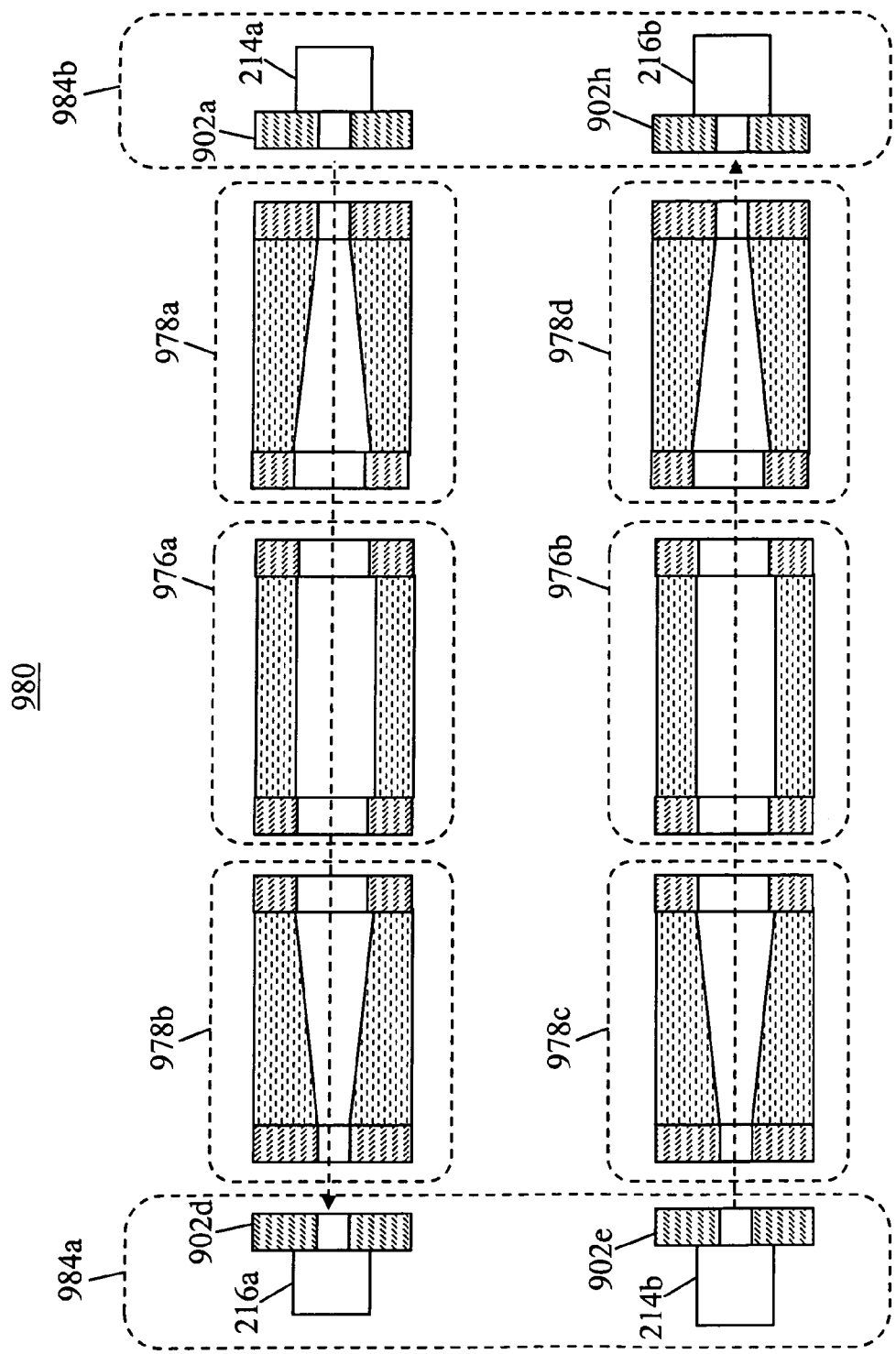
FIG. 9e is a schematic diagram of a fiber-optic system, according to an alternative embodiment of the invention.

FIG. 9e is a schematic diagram of a fiber-optic system 980, according to an alternative embodiment of the invention. As shown, the system 980 is a bi-directional communication system comprising a first transceiver or transponder module 984a having a transmitter 214b and a receiver 216a as well as a second transceiver or transponder module 984b having a transmitter 214a and a receiver 216b. A pair of multimode fiber links or fiber-optic cables 976a, 976b are installed to convey optical signals from a transmitter of one of modules 984a, 984b to a receiver of the other of the modules and vice-versa. Fiber cables or patch cords 978a–978d, each including an adiabatic coupler, are optically coupled between the multimode fiber links 976a, 976b and the transceiver or transponder modules 984a, 984b. The transceiver or transponder modules 984a, 984b may include optical connectors or similar connecting means 902a, 902d, 902e and 902h to facilitate optical coupling to the fiber cables or patch cords 978a–978d.

An improved multi-mode fiber optic communication system using an adiabatic taper coupler has been disclosed. A preferred embodiment of a multi-mode fiber optic communication system in accordance with the present invention comprises a multi-mode fiber (MMF) that carries an optical signal having a plurality of modes, an adiabatic coupler optically coupled to and receiving the modes of the optical signal from the MMF and a single-mode fiber (SMF) that receives a single-mode of the signal from the adiabatic coupler. The adiabatic coupler may comprise either a uniformly tapered core surrounded by a cladding or may comprise a core surrounded by a cladding wherein the refractive index of either the core or the cladding varies uniformly along the length of the adiabatic coupler. A method of fabricating a tapered-core adiabatic coupler in accordance with the present invention comprises the steps of splicing a MMF to a SMF, heating the splice and pulling the MMF and SMF apart, while heating, such that an appropriate taper region is formed. An optical communications system in accordance with the present invention has advantageous qualities of decreased modal noise and lower loss of the fundamental mode relative to conventional multi-mode fiber-optic communications systems.

Although the present invention has been disclosed in accordance with the embodiments shown, one of ordinary skill in the art will readily recognize that there could be variations to the embodiments and those variations would be within the spirit and scope of the present invention. For instance, the embodiments of the present invention that have been described above are based upon optical fibers. More generally, however, a well-designed planar waveguide coupler, either with a gradually changed physical layer dimension (taper), or with a gradually changed refractive index profile, can serve the same function. Many other similar modifications could readily be envisioned by one of skill in the art without departing from the spirit and scope of the appended claims, which claims alone define the invention.

The invention claimed is:

1. An optical module, comprising:
    an optical device;
    an adiabatic coupler optically coupled to the optical device, wherein the adiabatic coupler is configured to enable a fundamental mode of light to propagate adiabatically therethrough, the adiabatic coupler having a core with a constant diameter from a first end to a second end and a cladding surrounding the core, wherein the cladding has a refractive index that varies from the first end to the second end; and
    an optical connector affixed to the adiabatic coupler.

2. The optical module of claim 1, wherein the optical device is a transmitter.

3. The optical module of claim 1, wherein the optical device is a receiver.

4. The optical module of claim 1, further comprising a single-mode fiber optically coupled between the optical device and the adiabatic coupler.

5. The optical module of claim 1, wherein the variation of the refractive index is such that a mode field at the first end of the core substantially matches a mode field of the multi-mode fiber and a mode field at the second end of the core substantially matches a mode field of the single-mode fiber.

6. A fiber-optic communications system, comprising:
    a multi-mode fiber having a first end and a second end;
    a first single-mode fiber;
    a first adiabatic coupler optically coupled to the first end of the multi-mode fiber and to one end of the single-mode fiber, wherein the adiabatic coupler is configured to enable a fundamental mode of light to propagate adiabatically between the multi-mode fiber and the single-mode fiber;
    a second single-mode fiber; and
    a second adiabatic coupler optically coupled to the second end of the multi-mode fiber and to one end of the second single-mode fiber, wherein at least one adiabatic coupler includes a core having a first end and a second end and a cladding surrounding the core, wherein one of the core or the cladding has a refractive index that varies from the first end to the second end.

7. The fiber-optic communications system of claim 6, wherein at least one adiabatic coupler includes a tapered core having a first end with a first diameter and a second end with a second diameter, wherein the first diameter is greater than the second diameter.

8. The fiber-optic communications system of claim 7, wherein the first diameter is sized such that a mode field at the first end of the tapered core substantially matches a mode field of the multi-mode fiber, and the second diameter is sized such that a mode field at the second end of the tapered core substantially matches a mode field of the single-mode fiber.

9. The fiber-optic communications system of claim 8, wherein the light is transmitted from the multi-mode fiber to the single-mode fiber.

10. The fiber-optic communications system of claim 8, wherein the light is transmitted from the single-mode fiber to the multi-mode fiber.

11. The fiber-optic communications system of claim 6, wherein the variation of the refractive index is such that a mode field at the first end of the core substantially matches a mode field of the multi-mode fiber and a mode field at the second end of the core substantially matches a mode field of the single-mode fiber.

12. The fiber-optic communications system of claim 11, wherein the light is transmitted from the multi-mode fiber to the single-mode fiber.

13. The fiber-optic communications system of claim 11, wherein the light is transmitted from the single-mode fiber to the multi-mode fiber.

14. The fiber-optic communications system of claim 6, wherein the core has a constant diameter between the first end and the second end.

15. The fiber-optic communications system of claim 6, wherein the core has non-constant diameter between the first end and the second end.

16. The fiber-optic communications system of claim 6, wherein the first single-mode fiber and the first adiabatic coupler are housed in a first module, the multi-mode fiber is housed in a second module, and the second single-mode fiber and the second adiabatic coupler are housed in a third module.

17. A fiber-optic communications system, comprising:
    a multi-mode fiber having a first end and a second end;
    a first optical device;
    a first adiabatic coupler optically coupled to the first end of the multi-mode fiber and to one end of the first optical device;
    a second optical device; and
    a second adiabatic coupler optically coupled to the second end of the multi-mode fiber and to one end of the second optical device, wherein each adiabatic coupler is configured to enable a fundamental mode of light to propagate adiabatically therethrough, wherein the first optical device and the first adiabatic coupler are housed in a first module, the multi-mode fiber is housed in a second module, and the second optical device and the second adiabatic coupler are housed in a third module.

18. The fiber-optic communications system of claim 17, wherein the modules are interconnected via a plurality of fiber connectors.

* * * * *